US009168686B2

(12) United States Patent
McMillan et al.

(10) Patent No.: US 9,168,686 B2
(45) Date of Patent: Oct. 27, 2015

(54) APPARATUS FOR FORMING A COMPOSITE COMPONENT

(75) Inventors: Alison J. McMillan, Uttoxeter (GB); Ian C. D. Care, Derby (GB)

(73) Assignee: ROLLS-ROYCE plc, Derby (GB)

( * ) Notice: Subject to any disclaimer, the term of this patent is extended or adjusted under 35 U.S.C. 154(b) by 378 days.

(21) Appl. No.: 13/354,802

(22) Filed: Jan. 20, 2012

(65) Prior Publication Data
US 2012/0205835 A1 Aug. 16, 2012

(30) Foreign Application Priority Data

Feb. 11, 2011 (GB) .................................... 1102406.4

(51) Int. Cl.
B29C 43/36 (2006.01)
B30B 11/00 (2006.01)
B29C 70/48 (2006.01)
B29C 70/54 (2006.01)
B29C 43/58 (2006.01)

(52) U.S. Cl.
CPC .............. B29C 43/36 (2013.01); B29C 70/48 (2013.01); B29C 70/548 (2013.01); B30B 11/001 (2013.01); B30B 11/005 (2013.01); B29C 43/3697 (2013.01); B29C 2043/3655 (2013.01); B29C 2043/3665 (2013.01); B29C 2043/5808 (2013.01); B29C 2043/5833 (2013.01)

(58) Field of Classification Search
None
See application file for complete search history.

(56) References Cited

U.S. PATENT DOCUMENTS

| 5,039,371 | A | 8/1991 | Cremens et al. |
| 5,151,277 | A | 9/1992 | Bernardon et al. |
| 5,672,227 | A | 9/1997 | Chiu |
| 7,819,651 | B2 * | 10/2010 | Benson et al. ................ 425/374 |
| 2003/0227107 | A1 | 12/2003 | Stewart |

FOREIGN PATENT DOCUMENTS

| EP | 2 236 271 A1 | 10/2010 |
| GB | 944955 | 12/1963 |
| WO | WO 2008/045680 A1 | 4/2008 |

OTHER PUBLICATIONS

May 14, 2012 Search Report issued in European Patent Application No. EP 12 15 1888.
Search Report issued in British Application No. GB1102406.4 dated Jun. 7, 2011.

* cited by examiner

Primary Examiner — Benjamin Schiffman
(74) Attorney, Agent, or Firm — Oliff PLC

(57) ABSTRACT

Apparatus 200 for forming a composite component is disclosed, the apparatus comprising: a deformable mold tool 204 that at least partially defines a mold cavity 212; an interface layer 222 formed on an external surface of the mold tool 204; and at least two peristaltic actuators 206, mounted to contact the interface layer 222 and to generate a peristaltic pressure wave in the mold tool 204. The peristaltic actuators comprise rollers 206, pistons 306 or bi-metallic blocks 406. A method of forming a composite component is also disclosed, the method employing a mold tool 204 that at least partially defines a mold cavity 212. The method comprises: placing reinforcing fibers into the mold cavity 212, forcing a matrix material into the mold cavity 212 through the reinforcing fibers, and generating a peristaltic pressure wave within the mold tool 204 during forcing of the matrix material into the mold cavity 212.

13 Claims, 4 Drawing Sheets

% Fill of Mould

Time to Fill

APPARATUS FOR FORMING A COMPOSITE COMPONENT

This invention claims the benefit of UK Patent Application No. 1102406.4, filed on 11 Feb. 2011, which is hereby incorporated herein in its entirety.

The present invention relates to apparatus for forming a composite component, and to an associated method. The invention relates particularly to the forming of composite components using liquid moulding processes, such as resin transfer moulding (RTM).

Components formed from composite materials are widely used across a range of industries, including in the aerospace and automotive sectors. Composite components comprise a network of reinforcing fibres held within a typically resinous matrix material, and may be formed using a variety of processes. Liquid moulding processes are widely used for the forming of composite components, and a typical liquid moulding process comprises the following steps:
 a) a fibre preform is inserted into the mould, to form the reinforcement element of the composite component;
 b) the mould is sealed;
 c) the matrix material, in its liquid state, is forced under pressure into the mould and flows through the fibre preform until it reaches an outflow; and
 d) solidification of the matrix material is induced to form the finished component.

The fibre preform may for example be a stack of fibre laminates, or may be a 3D woven or stitched piece of fabric that is formed from the reinforcing fibres. The shape of the preform approximates the net shape of the finished component.

Solidification of the matrix material may be induced by heating or cooling. In the case of thermoset polymer matrix materials, a chemical change is induced in the material by heating. For thermoplastic or metal matrix materials, solidification is induced by cooling.

FIG. 1 shows a cross section through a typical composite component mould 2. The geometry of the mould cavity 4 is not representative of any specific component, but illustrates features commonly found in composite components for a range of applications. The matrix material inlet 6 is illustrated on the left of the Figure and the outflow 8 is on the right. The fibre preform is placed inside the mould cavity 4, closely conforming to the internal geometry of the mould cavity.

Thermoset matrix materials are of high viscosity, typically 100 times that of water. Thermoplastic matrix materials have a viscosity between 1000 and 1000000 times that of thermosets. Very high pressures are therefore required to force the matrix material though the mould cavity. High pressures at the material inlet generate a pressure gradient between the inlet and the outlet, which increases with the size of the mould; the greater the distance to be traveled by the matrix material, the larger the pressure gradient. A vacuum may be drawn at the outlet of the matrix material, to assist in drawing the material through the full volume of the mould cavity. In addition, multiple outflow locations may be provided, especially where the component geometry is complex, in order to ensure a good fill in all regions of the mould, and to minimise the distance over which the matrix material must travel.

The path of the matrix material through the mould cavity is obstructed by the presence of the fibre preform. The preform is composed of fibre tows, which may be woven, stitched or assembled in any other appropriate manner. The tows are themselves composed of individual filaments of reinforcing material. The blocking action of the preform within the mould is a function of the fibre volume fraction within the mould, the weave or layup style of the preform, the complexity of the volume of the mould cavity, and the compliance of the mould tooling. The degree of obstruction caused by the preform in the mould is referred to as the permeability of the preform. The structure of the preform means that there are in fact two "effective permeabilities" in the preform: the permeability in the space between the tows, and the permeability in the space between the filaments inside the tows. In the time taken for the viscous matrix material to move through the mould cavity, full infusion inside the fibre tows may not be complete.

In the finished component, it is desirable to maximise the fibre volume fraction in order to achieve favourable structural properties, but increasing the fibre volume fraction has the effect of reducing the permeability of the preform during forming of the component. In order to achieve a high fibre volume fraction, the fabric of the preform is crushed within the mould cavity, flattening the tows and greatly reducing the permeability of the preform. This reduced permeability means that an increased pressure gradient is required to force the matrix material through the mould cavity. In order to address the issue of fibre volume fraction, it is known to provide multiple mould settings, allowing matrix material injection to take place at a relatively low fibre volume fraction, after which the mould cavity is reduced, the tool faces being brought closer together and squeezing out excess matrix material. An overflow gutter may be provided around the edge of the mould to catch this excess material. Mechanical closing of the mould to increase the fibre volume fraction is resisted by the injected fluid and the reducing permeability of the preform, meaning this approach is only suitable if the matrix material doesn't have far to flow and the tooling is sufficiently rigid not to distort. A relatively porous sacrificial material may also be used as a wick, acting to draw the matrix material and distribute it throughout the preform during material infusion.

Even with the application of variable mould settings, and others of the techniques described above, the fact remains that driving highly viscous fluids through relatively low permeability preforms requires the application of high pressure. High operating pressures mean high grade equipment; powerful compressors, thick pipes, stiff tooling and consequently greater energy consumption, all leading to higher unit cost for the components manufactured. For large components, a significant pressure drop between inlet and outlet is inevitable, meaning pressures at the outlet of the component mould may be lower, and less easily controlled. This has implications for component quality and durability in the outlet region, as high pressure is necessary for the suppression of void formation. Voids in the injected matrix material result in undesirable porosity in the finished component. Where it is impractical to increase pressure levels to address this, injection time must increase, again increasing unit cost. However, there is a finite limit to the length of time that the injection process can take, as discussed below.

If a thermosetting matrix material is employed, increasing temperature in order to reduce viscosity and speed the injection process is only possible to a certain degree, as higher temperatures induce the onset of gelation and cure of the component. Cure is exothermic, so as soon as one region starts to gel, a surrounding neighbourhood also begins the process of gelation. Pressure gradients within the flowing material also induce local thermal changes, though the second law of thermodynamics, meaning that a variety of interacting effects must be managed. The ultimate result of these conflicting and interacting factors is that there is a practical limit to the length of time that the injection process can take before the onset of solidification, and this imposes a finite limit on the size of component that can be manufactured.

High pressures within the mould cavity can also lead to disruption of the fibres within the preform. This disruption may take the form of fibre waviness, regions of higher or lower fibre concentration, or creases or folds or wrinkles forming in the preform during the infusion. Regions of higher or lower concentration are a particular concern in component designs having unidirectional fibre regions. Folds or creases or wrinkles are a particular issue in components including a "T" joint.

The present invention seeks to address some or all of the above noted disadvantages of existing methods and apparatus for liquid moulding of composite components.

According to the present invention, there is provided apparatus for forming a composite component, comprising: a deformable mould tool that at least partially defines a mould cavity; an interface layer formed on an external surface of the mould tool; and at least two peristaltic actuators, mounted to contact the interface layer and to generate a peristaltic pressure wave in the mould tool.

The interface layer may be integrally formed with the mould tool. Alternatively, the interface layer may be a separate component and may be sealed to the mould tool, for example by adhesive or other mechanical means.

The interface layer may be flexible and may function as a flexible caul, ensuring even pressure distribution over the tool. This allows for distortion of the mould tool under pressure, while at the same time preventing localised pressure spikes and protecting the tool from high contact stresses. The interface layer may be formed from flexible caul materials such as invar sheet, mosite (platinum cured silicone sheet)—both could have external stiffening with such as carbon patches, strips, or sheets. For a semi-rigid tool the caul plate could be sprung steel plate or directionally rolled steel plate. Alternately, or in addition, multiple layers may be used with a softer material, for example silicone, being used as an immediate interface with a stiffer material for example metal, ceramic or composite providing support. The stiffer material may be ribbed or other wise structured to provide controlled flexure.

The peristaltic actuators may comprise rollers which may be mounted to roll across a surface of the interface layer, so generating the peristaltic pressure wave.

The separation between the rollers may be variable, allowing for variation of the wave form.

The peristaltic actuators may comprise pistons. The pistons may be mechanically attached to the interface layer, such that the pistons are operable to apply tensile or compressive force to the interface layer.

The peristaltic actuators may comprise metallic blocks and associated heating elements, the blocks being mounted on a fixed, rigid backing layer.

At least two of the blocks may be formed from materials having different thermal expansion coefficients. In this manner, the blocks may exhibit a "bimetallic effect" the differing thermal expansion applying varying pressure to the interface layer, thus generating a peristaltic pressure wave.

It will be appreciated that the apparatus may comprise a plurality of actuators of any of the forms disclosed, arranged along the interface layer. The number of actuators may be selected according to the dimensions of the mould tool and the desired wavelength of the peristaltic pressure wave to be generated in the tool. It will be further appreciated that increasing the number of actuators increases the fineness of control that can be achieved in managing the applied pressure within the tool.

The pressure wave does not have to be linear, as for instance in the case of centre of mould injection the wave may be circular emanating from the injection point.

The deformable mould tool may comprise first and second opposed tool sections that cooperate to define the mould cavity, each tool section having an associated interface layer formed on an external surface thereof, and at least two associated peristaltic actuators mounted to contact the associated interface layer and to generate a peristaltic pressure wave in the tool section.

In another embodiment, the apparatus may further comprise a rigid mould tool that is in opposed relation to the deformable mould tool and cooperates with the deformable mould tool to define the mould cavity.

The apparatus may further comprise a control system, which may be arranged to control the action of the peristaltic actuators.

The control system may further comprise sensing elements, operable to sense parameters representative of conditions within the mould tool and deliver the sensed parameters to a processing unit of the control unit.

According to another aspect of the present invention, there is provided a method of forming a composite component using a mould tool that at least partially defines a mould cavity, comprising: placing reinforcing fibres into the mould cavity, forcing a matrix material into the mould cavity through the reinforcing fibres, and generating a peristaltic pressure wave within the mould tool during forcing of the matrix material into the mould cavity.

The reinforcing fibres may be woven, stitched or otherwise assembled as a preform.

The peristaltic pressure wave may be generated by at least one of rollers, pistons or bi-metallic structures.

For a better understanding of the present invention, and to show more clearly how it may be carried into effect, reference will now be made, by way of example, to the following drawings, in which:—

The present invention recognises that viscous fluids are moved around biological systems by peristalsis. Movement of viscous fluids is effected by alternating contraction and relaxation of the walls of a vessel carrying the fluid. This contraction and relaxation is coordinated into a wave like pattern, ensuring one way motion of the fluid and reducing the effective length of the vessel over which a pressure differential is required to the characteristic wavelength of the peristaltic motion. The present invention employs the principals of peristalsis within apparatus and methods for forming a composite component in order to address at least some of the above noted disadvantages of existing systems.

Figure 1:
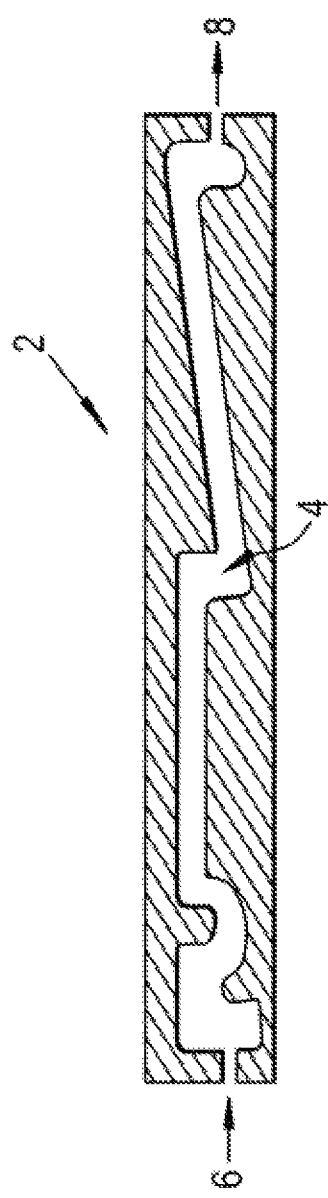
FIG. 1 is a sectional view of a mould embodying features known in the art.
Figure 2:
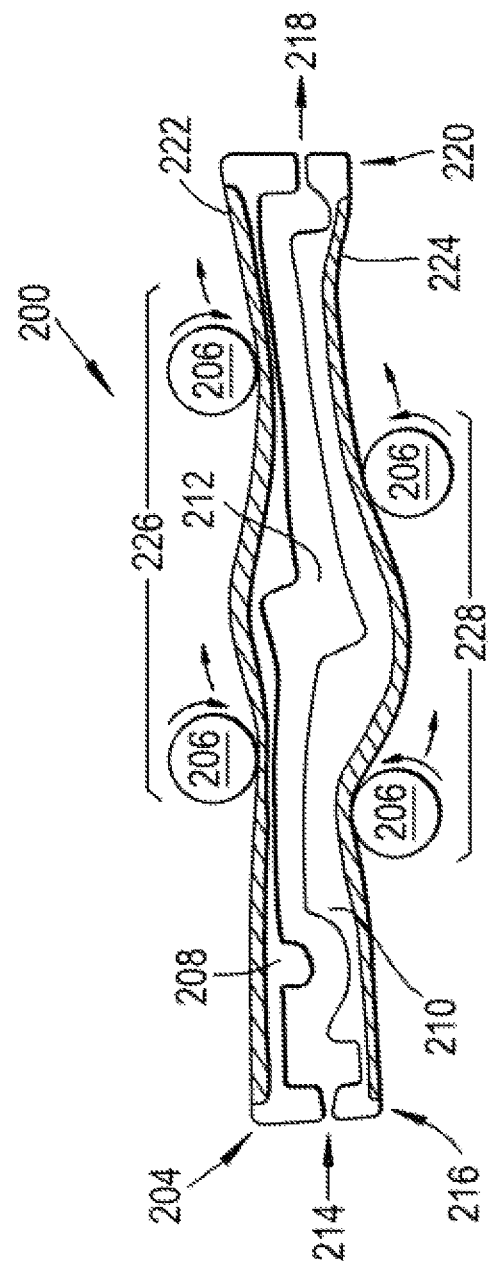
FIG. 2 is a sectional view of apparatus according to the present invention.

With reference to FIG. 2, a first embodiment of apparatus 200 for forming a composite component comprises a deformable mould tool 204 and a plurality of peristaltic actuators in the form of rollers 206. The mould tool 204 comprises first and second tool sections 208, 210 which cooperate to define a mould cavity 212 between them. The cavity 212 is operable to receive a fibre preform (not shown) and comprises a fluid inlet 214 at a first or inlet end 216 and a fluid outlet 218 at a second or outlet end 220. First and second interface layers 222, 224 are formed on external surfaces of the opposing first and second tool sections 208, 210. The interface layers 222, 224 comprise flexible cauls formed from Invar sheet and sealed to the external surfaces of the tool sections 208, 210 using an appropriate adhesive. In other embodiments, the flexible cauls 222, 224 may comprise any other suitable material such as sprung steel sheet, and may be attached through contact or by other mechanical means to the tool sections 208, 210. In still other embodiments, the flexible cauls made from such as reinforced or non-reinforced inosite may be integrally formed with the tool sections 208, 210. In still further embodiments multiple layers may be used with a softer material, for example silicone, being used as an immediate interface with a stiffer material for example metal, ceramic or composite providing support. The stiffer material may be ribbed or other wise structured to provide controlled flexure.

In the illustrated embodiment, the apparatus 200 comprises four rollers 206 divided into first and second pairs of rollers 226, 228. The first pair of rollers 226 contacts the interface layer 222 of the first tool section 208, and the second pair of rollers 228 contacts the interface layer 224 of the second tool section 210. The first and second pairs of rollers 226, 228 are staggered with respect to each other, such that the second pair of rollers 228 is offset from the first pair of rollers 226 in the vertical direction, as seen in FIG. 2. The rollers 206 are mounted to apply pressure to the adjacent interface layer 222, 224 and through the layer to the corresponding tool section 208, 210. The rollers are mounted to roll along the adjacent interface layer from the inlet end 216 to the outlet end 218.

In use, the rollers 206 assist the infusion of matrix material into the mould cavity 212. The action of the rollers 206 as they are rolled along the interface layers 222, 224 is to cause distortion in the tool sections 208, 210. This distortion results in squeezing or contraction of the mould cavity 212 in certain regions, and opening up or expansion of the mould cavity 212 in adjacent regions. The regions of contraction and expansion travel along the mould cavity from the inlet end 216 to the outlet end 218 with the motion of the rollers 206, forming a peristaltic pressure wave within the tooling. The effect of the contraction and expansion of the mould cavity 212 is to move the viscous liquid of the matrix material from the squeezed regions into the more open regions immediately ahead in the direction of travel. As the fibre volume fraction in the more open regions is lower, the viscous liquid flows more readily into it from the contracted regions. As the rollers 206 pass over the more open regions, these regions are then contracted, and the fibre volume fraction is increased, but excess liquid passes easily into the newly opening regions just ahead, where the fibre volume fraction is decreasing.

The role of the flexible cauls 222, 224 during the motion of the rollers 206 is to ensure even pressure distribution over the tool sections. The flexibility of the cauls 222, 224 allows for distortion of the mould tool sections 208, 210 while at the same time preventing localised pressure spikes and protecting the tool sections 208, 210 from high contact stresses.

Repeated passage of the rollers 206 leads to an even distribution of matrix material throughout the cavity 212. Successive passes of the rollers 206 may be at higher or lower normal applied force, such that the final configuration is close to equal pressure/internal stress distributed throughout the cavity 212. Under such conditions, the tool sections 208, 210 return to their substantially "undeformed" geometry. It should be appreciated that "undeformed" refers to the correct shape required to produce the finished component. Internal pressure, curing, cooling and out of mould springback all mean that there is a difference between the "undeformed" shape of the mould tool sections 208, 210 and the final component shape.

The action of the rollers 206 may also be combined with multi-step tooling closure, such that the overall fibre volume fraction is stepped up between passes of the rollers 206. It will be appreciated that the apparatus may comprise more or less than the two pairs of rollers 226, 228 described and illustrated in FIG. 2. The number of rollers 206 may be selected according to the size of the mould tool 204 and the level of control and variation required in the generation of the peristaltic pressure wave. It will also be understood that the mould tool may comprise a single deformable tool section in opposed relation to a substantially rigid, non deformable tool section. In this instance, the peristaltic pressure wave may be generated in only one section of the mould tool, contracting and expanding the mould cavity 212 along one side only of the cavity 212.

The embodiment of apparatus described above and illustrated in FIG. 2 is particularly suited to the formation of components where the outer tooling surfaces are substantially flat, or are of single curvature.

Figure 3:
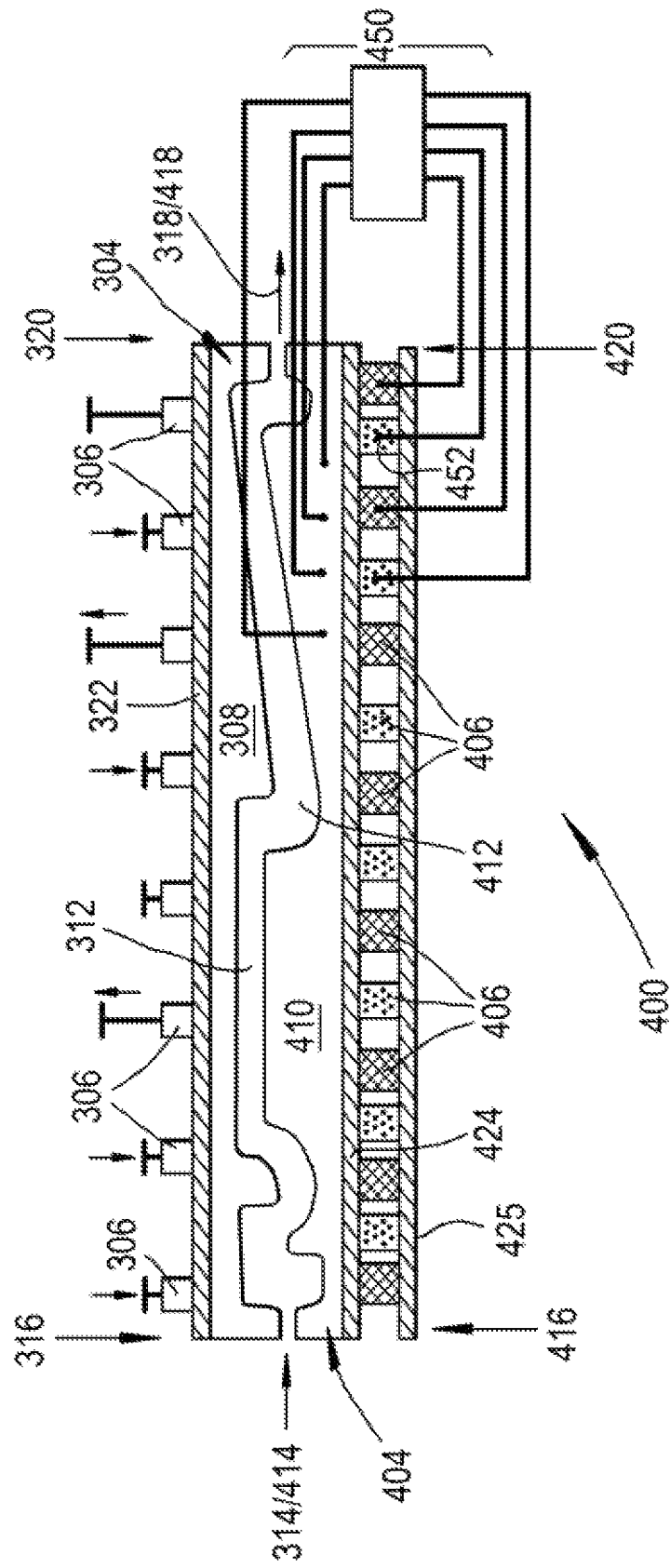
FIG. 3 is a sectional view of another embodiment of apparatus according to the invention.

FIG. 3 illustrates two alternative embodiments of apparatus; the first embodiment is illustrated in the upper tool section of the Figure and the second embodiment is illustrated in the lower tool section of the Figure. The two alternative embodiments are illustrated in the same apparatus for compactness of presentation in FIG. 3, but are described separately below. It is envisaged that in practice, any apparatus would employ only a single embodiment of the invention. This embodiment may be employed in both tool sections of an apparatus, or in a single tool section placed in opposed relation to a rigid, undeformable tool section, as described above with respect to the first embodiment.

With reference to the upper half of FIG. 3, and in accordance with a first alternative embodiment of the invention, an apparatus 300 for forming a composite component comprises a deformable mould tool 304 and a plurality of peristaltic actuators in the form of pistons 306. The mould tool 304 comprises first and second tool sections 308, 310 (of which only the upper tool section 308 is shown), which cooperate to define a mould cavity 312 between them. The cavity 312 is operable to receive a fibre preform (not shown) and comprises a fluid inlet 314 at a first or inlet end 316 and a fluid outlet 318 at a second or outlet end 320. The following description of the apparatus 300 is directed to the upper tool section 308 and associated components, but it will be appreciated that corresponding features and components may be found on the lower tool section 310 (not shown).

An interface layer 322 is formed on the external surface of the first tool section 308. The interface layer 322 comprises a flexible caul having features and being attached in a manner as described above with respect to the flexible cauls 222, 224 of the first embodiment.

As illustrated in FIG. 3, the plurality of pistons 306 is arrayed across the flexible caul 322. When mechanically attached to the caul 322, the pistons 306 can apply compressive or tensile loading to the caul 322, and through the caul 322 to the associated tool section 308. The pistons 306 apply discrete point loading, and the caul 322 ensures that this pressure is more evenly distributed in the tool section 308. The tensile and compressive loading of the pistons 306 generates a peristaltic pressure wave in the tool section 308 similar to that created by the rollers 206 in the first embodiment shown in FIG. 2. This pressure wave has the same effect of contracting and expanding the mould cavity 312 and assisting the injection of viscous matrix material into and through the cavity 312 as is described above with respect to the first embodiment.

The pistons 306 provide increased flexibility of application, when compared to the rollers 206 of the first embodiment, and can be applied to tool surfaces of more complex curvature. The precise location of the individual pistons may be selected according to component geometry. This apparatus may therefore be used to beneficial effect in the formation of complex composite components, particularly where there are regions that are small and hard to fill, but where manufacturing quality is important and porosity and fibre distortion must be avoided.

With reference to the lower half of FIG. 3, and in accordance with a second alternative embodiment of the invention, an apparatus 400 for forming a composite component comprises a deformable mould tool 404 and a plurality of peristaltic actuators in the form of metallic blocks 406 and associated heating elements. The mould tool 404 comprises first and second tool sections 408, 410 (of which only the lower section 410 is shown), which cooperate to define a mould cavity 412 between them. The cavity 412 is operable to receive a fibre preform (not shown) and comprises a fluid inlet 414 at a first or inlet end 416 and a fluid outlet 418 at a second or outlet end 420. The following description of the apparatus 400 is directed to the lower tool section 410 and associated components, but it will be appreciated that corresponding features and components may be found on the upper tool section 408 (not shown).

An interface layer 424 is formed on the external surface of the second tool section 410. The interface layer 424 comprises a flexible caul having features and being attached in a manner as described above with respect to the flexible cauls 222, 224 of the first embodiment.

As illustrated in FIG. 3, the metallic blocks 406 are mounted between the flexible caul 424 and a fixed rigid backing layer 425. Each individual block 406 may have a dedicated heating element, or in a preferred embodiment, the heating elements for the individual blocks may comprise an adjacent region of the flexible caul 424 or backing layer 425, heat being applied in a controlled manner to either or both of the flexible caul 424 and/or backing layer 425. In the illustrated embodiment, the metallic blocks 406 comprise alternating blocks of two different materials, the materials having different coefficients of thermal expansion. However, it will be appreciated that the blocks may be arranged in configurations other than the illustrated alternating arrangement, and that more than two different materials may be used, providing a varying array of coefficients of thermal expansion. The blocks 406 exhibit a bi-metallic effect on heating by the flexible caul 424 and/or backing sheet 425. By changing the temperature in the caul 424 and/or backing sheet 425, the blocks can provide tensile or compressive loading in much the same way as the pistons 306, and can thus generate a peristaltic pressure wave in the tool section 310. This pressure wave has the same effect of contracting and expanding the mould cavity 412 and assisting the injection of viscous matrix material into and through the cavity 412 as is described above with respect to the first embodiment.

As can be appreciated by the skilled user, pistons and thermionic blocks are just two ways of exerting pressures to form a peristaltic wave. Other actuators such as piezoelectric stacks, hydraulic pads, etc could be used in their place.

Also illustrated in the lower part of FIG. 3 is a control system 450. The control system 450 will be described with reference to the second alternative embodiment of apparatus 400, but it will be appreciated that a control system of the type described below may be incorporated with beneficial effect into any embodiments of the present invention, including those disclosed above.

The control system 450 may be connected to all of the component parts of the apparatus 400, including the tool section 410, the cavity 412, the metallic blocks 406 and the flexible caul 424 and/or backing layer 425. The control system preferably includes sensing elements 452 and actuators operable to dictate behaviour of the peristaltic actuators of the apparatus. The control system 450 takes local measurements of liquid matrix material temperature, pressure and velocity. It may also take measurements of electrical capacitance, as the dielectric constant of the matrix material changes from the liquid state through gelation to the cured state. From these measurements, and comparison with theoretical, modelling or intelligent system interpretation, the state of viscosity and possible onset of gelation of the matrix material may be deduced. The control system then initiates appropriate action in the bi-metallic blocks 406 (or in the rollers 206 or pistons 306) to manage the infusion and cure of the matrix material.

A primary advantage of the control system 450 is in managing the effects of resin matrix material ageing. Aspects of the behaviour of a resin matrix material can change over the shelf life of the material, and these changes can lead to substantial variations in the pressure differential required to drive the liquid resin into the preform. The control system 450 provides real time information as to the behaviour of the matrix material, compensating for any behavioural changes owing to the age of the material. The system thus allows for a relaxation in acceptable shelf life limits for certain resin matrix materials, meaning that batch sizes can be increased without impacting upon finished component quality. The system 450 can also manage the effects of other variations affecting the injection process. Manufacturing variables can induce slight differences in the preform shape and size. These differences are minor in themselves but can influence the local preform permeability and hence the flow of matrix material. Real time feedback and control through the control system 450 can compensate for these minor variations, optimising infusion of the matrix material into and through the preform.

In addition to compensating for variations affecting resin inflow, the control system 450 affords advantages in improving and ensuring finished component quality. The control system can be programmed to closely manage all stages of the infusion process at a local level. Thus, regions that are prone to fabric distortion can be targeted with low pressure liquid flow. This is achieved by the control system maintaining that region of the mould cavity as open as possible, and encouraging flow without over increasing the pressure differential. This region can then be squeezed down to final thickness again at low pressure differential. The localised flexibility of the piston arrays or bi-metallic blocks of FIG. 3 lend themselves well to this close control, allowing the application of specific pressure regimes to problem areas, while neighbouring regions continue to be subject to the contraction and, expansion of the peristaltic wave motion.

The close control described above can even be used to induce early gelation in specific, problem prone areas, fixing the matrix material and fibres in place to avoid distortion while the rest of the cavity is filled. In order to achieve this localised seeded cure, thermal actuation is used to raise the temperature of the resin matrix material in a localised problem area to the gelation temperature. Cure then begins in this region, locking the fibres into position. Temperature controls remote from the region, together with thermal conduction through the preform fibres and thermal convection from the resin flow ensure that gelation does not spread, maintaining the gelation region finite until full infiltration of the preform is complete.

Figure 4A:
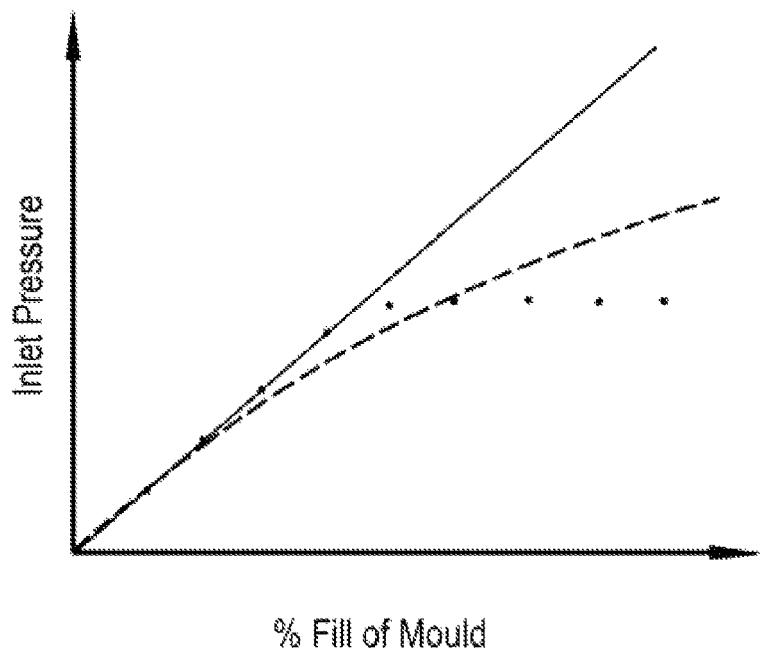
FIGS. 4a and 4b are graphs of inlet pressure for a component mould against time to fill the mould and the % fill of the mould.
Figure 4B:
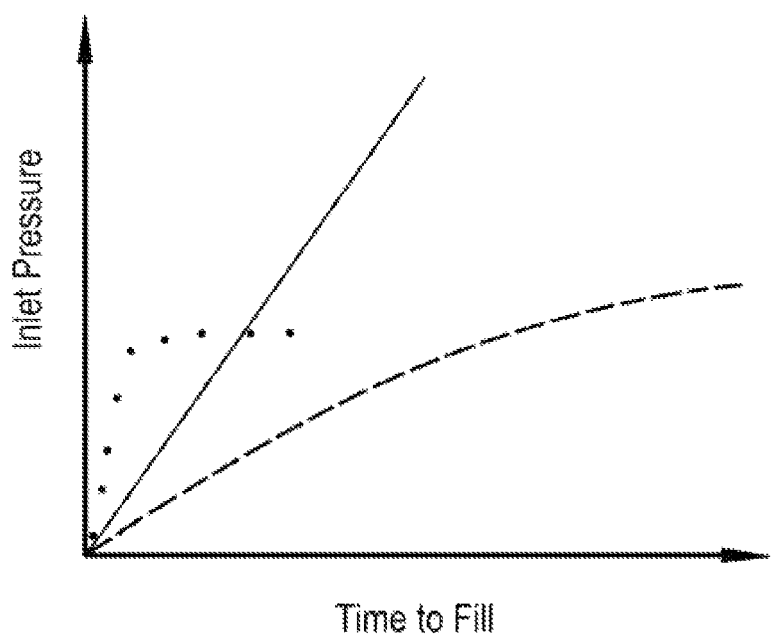

FIGS. 4a and 4b show schematic graphs of inlet pressure against percentage fill and fill time respectively. The solid line on each graph shows a conventional fast infusion, the dashed line shows a conventional slow infusion, and the dotted line shows what could be achieved through the present invention.

The conventional fast fill system requires very high pressures towards the end of the fill process, with all the attendant disadvantages of very high pressure systems, as discussed above. The conventional slow fill system is less demanding of pressure, but substantially slower, increasing the unit cost of each item and placing a finite limit on the size of component that can be manufactured. The present invention has the potential to fill a mould cavity more quickly than the fast fill system, and use lower applied pressure than the slow fill system.

Figure 5A:
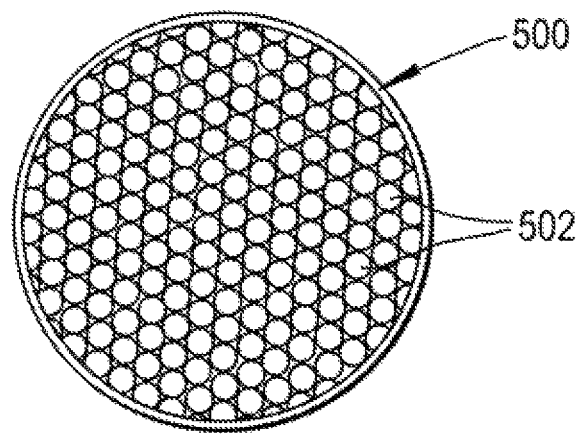
FIGS. 5a and 5b show two sectional views of a partially resin infused fibre tow.
Figure 5B:
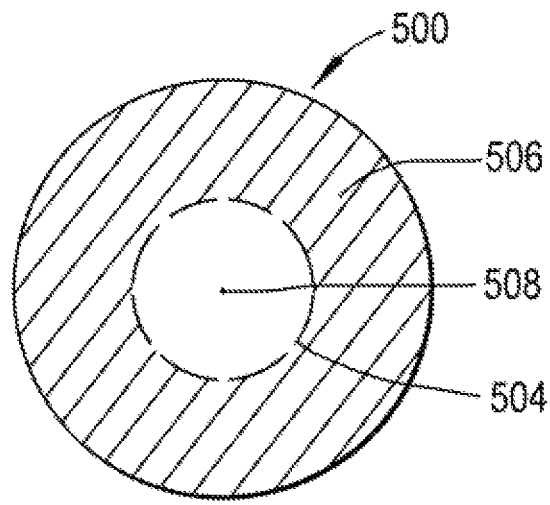

A further advantage of the present invention is manifested in its effect on the individual fibres within the fibre tows. As noted above, the effective permeability in the space between the individual fibres is different to, and considerably lower than that in the space between the tows. FIG. 5 shows a cross-section through a partially resin infused tow 500, FIG. 5a illustrating the filaments 502 and FIG. 5b illustrating the resin boundary 504 between the infused filament region 506 and the dry filament region 508. Typically a tow will contain of the order of a thousand filaments, all of which are quite closely packed and the number of fibres can range from tens of fibres per tow up to in excess of 50 thousand. There is usually a slight twist to the tow, which ensures that the filaments stay tightly packed to each other, particularly when they are in a woven fabric. Flattening the fabric down when the mould closes causes the filaments to move to new positions so that the overall tow shape becomes roughly elliptical or lenticular. In assuming this shape, the outermost filaments are placed under tensile or compressive loading, the loading changing with the cross sectional shape as the tow weaves between other tows.

For a perfectly aligned set of filaments within a tow, the filament bundle would be virtually impenetrable. It is only as the tow cross-section changes that gaps between filaments open up, as individual filaments must distort around each other to accommodate changes in cross-sectional shape dictated by tow weaving. These gaps allow for the penetration of liquid matrix material. Thus, in order for matrix material to penetrate into the fibre tow, the tow must be made to flex and move. This flexing motion is provided by the present invention, as repeated contraction and opening of the mould cavity also flexes the preform held within it. Flexing the preform opens and closes the filaments within the tows, thus encouraging early and complete infusion of the tows. As a consequence of this, any trapped gases are also teased out into the main body of fluid and carried to the upper surface and thence more rapidly to the outlets. This reduces porosity both within the tows, and in the tow-resin boundaries. Applying the peristaltic flexing when applying a pre-injection (partial) vacuum can assist in reducing the quantity of trapped gas or moisture.

The above described invention thus employs the principles of peristalsis to reduce the pressure gradient necessary for liquid composite moulding. In doing this, the peak pressures required are reduced, and larger component manufacture becomes more feasible. As an additional feature, a control system including sensors and actuators can be employed to maximise the advantages afforded, particularly by achieving localised seeded cure. This introduces additional solid regions in the mould cavity, influences the flow, and can be used to fix critical fibres into position and improve finished product quality.

The invention affords many advantages when compared with conventional apparatus and systems. These advantages can be largely categorised as: (i) reducing unit cost, (ii) improving finished component quality, (iii) reducing processing time, and (iv) reducing waste.

The invention reduces cost through the reduction in pressure required to force matrix material into and through the mould. Lower operating pressures reduce tooling and energy costs. Additionally, the finished parts spend less time in the tooling, reducing the necessary man and resource hours per finished component, and are of a higher or at least more predictable quality, reducing scrap losses. Finally, components can be redesigned to take advantage of the increased quality and predictability afforded by the invention, allowing lower weight, greater complexity of geometry and reduced post manufacture machining steps.

During the development phase, the control system can position the pistons or blocks to make small adjustments to the mould without the usual time and cost of cutting a new surface. Likewise if one part of the mould has a tendency to wear, such as when abrasive fillers (such as clay) are used in the matrix, this can be compensated for in a similar manner.

Finished product quality is improved owing to the reduction of pressure and flow effects on fibre alignment, reduced distortion, improved infiltration in difficult regions and particularly within the fibre tows, and reduced and/or more evenly distributed porosity. The early lock in of key fibres that can be achieved by localised seeded cure using the control system also provides considerable improvement in product quality.

Processing time is reduced by filling the mould more quickly, and thanks to the more even fill and faster equalisation of pressure following closure of the inlet.

Waste is reduced thanks to the extension of resin shelf life enabled by the control system. Also tooling can be made less durable or will last longer, and the process is more energy efficient.

The present invention has been described with reference to a resin transfer moulding (RTM) type process. However, it will be appreciated that the invention can be applied to other processing systems, such as a closed mould pre-preg system for debaulking of the preform before exerting final mould pressure and temperature for curing. Employing the present invention decreases the risk of fibre wrinkling through fibre movement during the cure cycle.

A primary application for the invention is in thermoset resin processing with carbon and/or glass fibre performs. However, the invention is equally applicable to other fibre types including basalt, boron, metal, nano-fibres, natural fibres such as hemp, or special fibres including Dyneema®. The invention is also applicable to other matrix materials such as metals or thermoplastics. The substantial differences in viscosity between these matrix materials could mean order of magnitude differences to the processing, but the principles and advantages afforded by the invention remain.

One field of application for the invention is in the manufacture of composite components for aero-engines. Particular benefits may also be enjoyed in industries where larger components are required, such as airframe and wing manufacture for aerospace applications, wind farm turbine blade manufacture and other civil engineering applications.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for forming a composite component, the apparatus comprising:
    a deformable mould tool at least partially defining a mould cavity, the deformable mould tool having a first stiffness;
    at least two peristaltic actuators configured to generate a peristaltic pressure wave in the mould tool, each peristaltic actuator including rollers; and
    a monolithic interface layer provided between an external surface of the mould tool and the at least two peristaltic actuators, the interface layer extending continuously over at least the mould cavity, the interface layer having a second stiffness greater than the first stiffness, and the rollers of the at least two peristaltic actuators being mounted to contact the interface layer and roll across a surface of the interface layer.

2. The apparatus as claimed in claim 1, wherein the interface layer is formed on the mould tool.

3. The apparatus as claimed in claim 1, wherein the interface layer is integrally formed with the mould tool.

4. The apparatus as claimed in claim 1, wherein the interface layer is sealed to the mould tool.

5. The apparatus as claimed in claim 1, wherein a separation between the rollers is variable.

6. The apparatus as claimed in claim 1, wherein the peristaltic actuators comprise metallic blocks and associated heating elements, the blocks being mounted on a fixed, rigid backing layer.

7. The apparatus as claimed in claim 6, wherein at least two of the blocks are formed from materials having different thermal expansion coefficients.

8. The apparatus as claimed in claim 1, wherein the deformable mould tool comprises first and second opposed tool sections that cooperate to define the mould cavity, each tool section having an associated interface layer formed on an external surface thereof and at least two associated peristaltic actuators mounted to contact the associated interface layer and generate a peristaltic pressure wave in the tool section.

9. The apparatus as claimed in claim 1, further comprising a rigid mould tool that is in opposed relation to the deformable mould tool and cooperates with the deformable mould tool to define the mould cavity.

10. The apparatus as claimed in claim 1, further comprising a control system, arranged to control the action of the peristaltic actuators.

11. The apparatus as claimed in claim 10, wherein the control system further comprises sensing elements, operable to sense parameters representative of conditions within the mould tool and deliver the sensed parameters to a processing unit of the control unit.

12. A method of forming a composite component using the apparatus of claim 1, the method comprising:
    placing reinforcing fibres into the mould cavity,
    forcing a matrix material into the mould cavity through the reinforcing fibres, and
    rolling the rollers across the surface of the interface layer such that a peristaltic pressure wave is generated within the mould tool during the forcing of the matrix material into the mould cavity.

13. A method of forming a composite component using a deformable mould tool at least partially defining a mould cavity, the method comprising:
    placing reinforcing fibres into the mould cavity,
    providing a monolithic interface layer between an external surface of the deformable mould tool and at least two peristaltic actuators having rollers, the deformable mould tool having a first stiffness and the interface layer having a second stiffness greater than the first stiffness, and the interface layer extending continuously over at least the mould cavity,
    forcing a matrix material into the mould cavity through the reinforcing fibres, and
    rolling the rollers across the surface of the interface layer such that a peristaltic pressure wave is generated within the mould tool during the forcing of the matrix material into the mould cavity.

* * * * *